Oct. 15, 1968   W. N. SUTLIFF ET AL   3,405,773
SLEEVE VALVE AND OIL WELL TOOL EMBODYING THE SAME
Filed Aug. 5, 1966   2 Sheets-Sheet 1
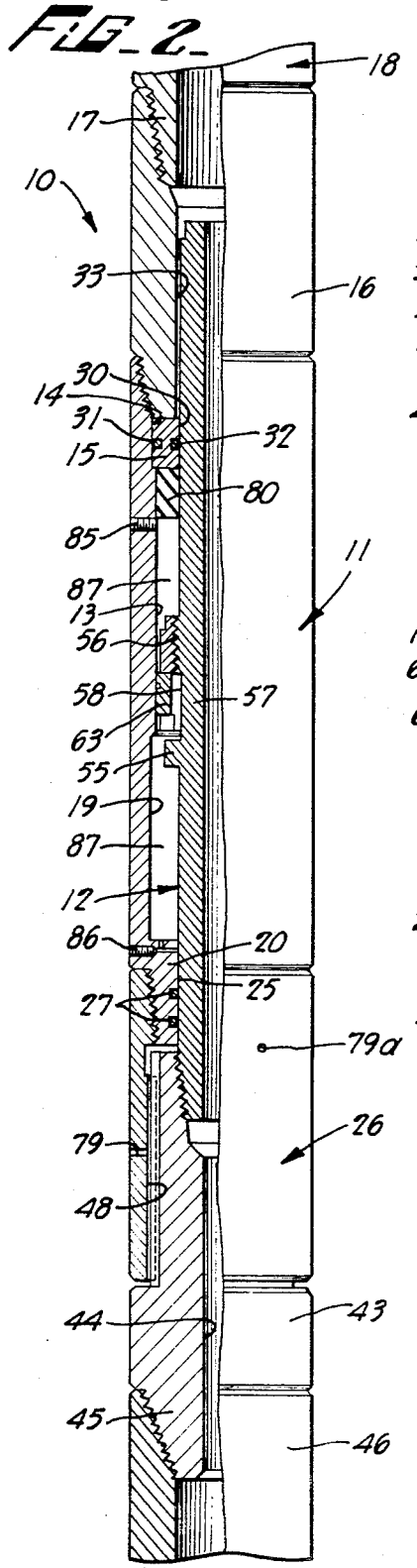
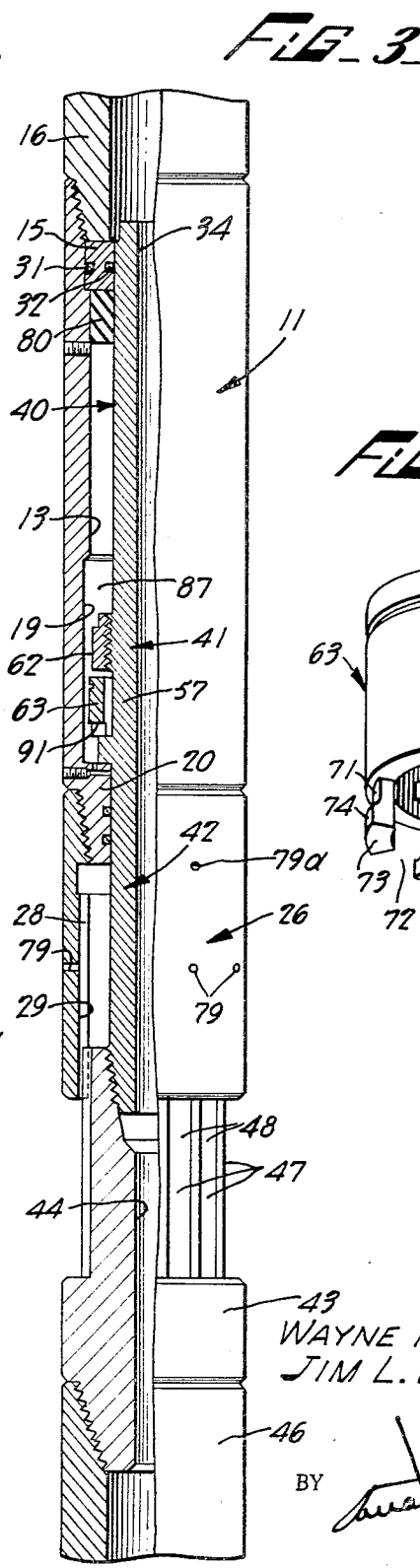
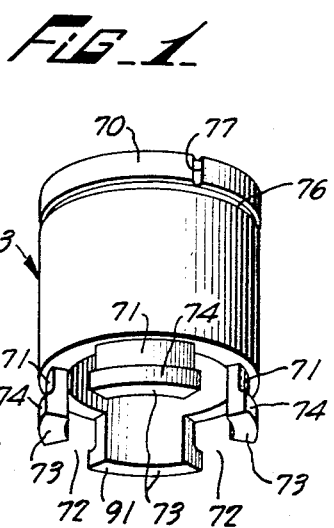
WAYNE N. SUTLIFF
JIM L. DOWNEN
INVENTORS.
BY
ATTORNEY.

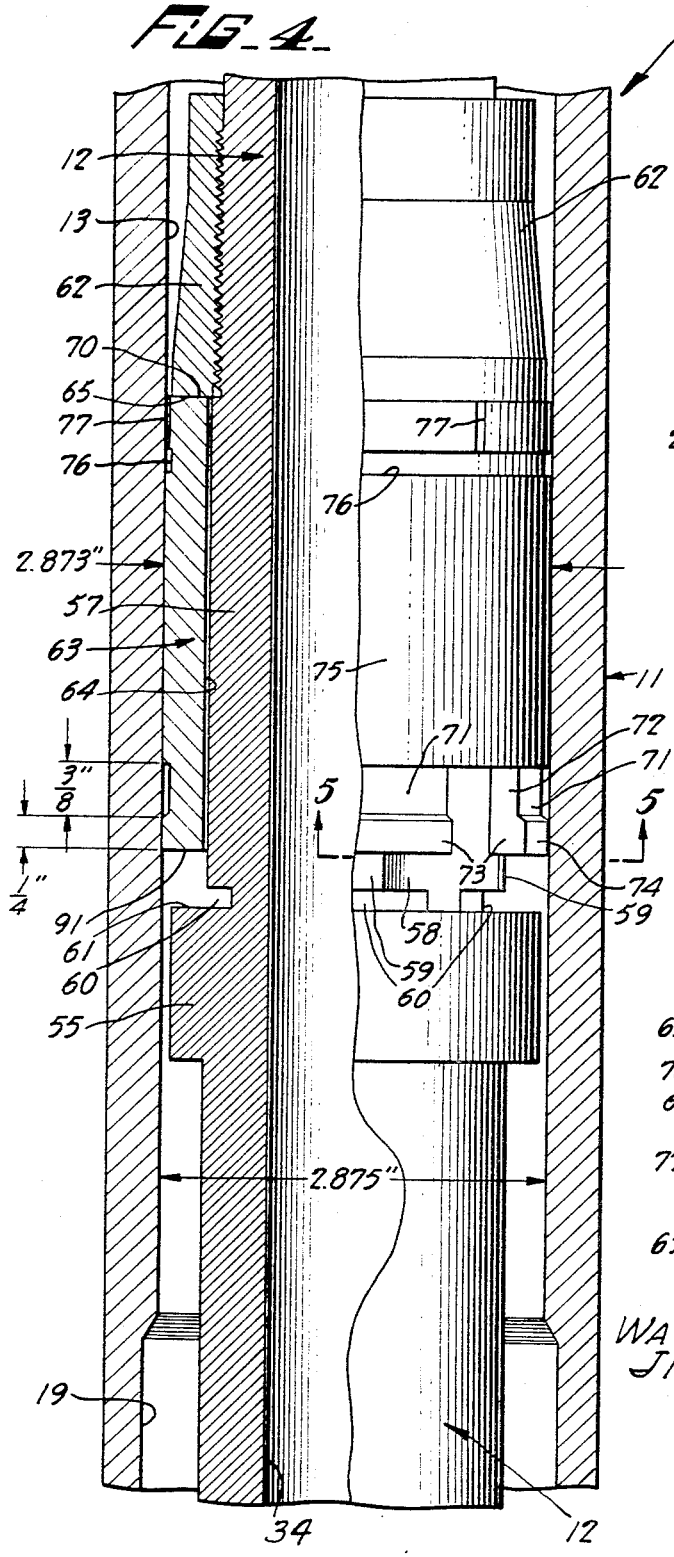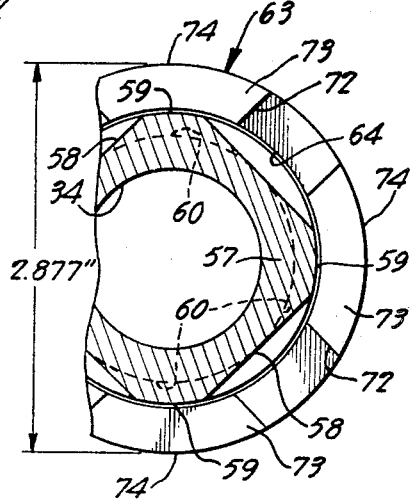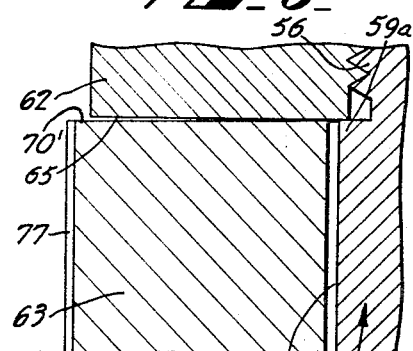

United States Patent Office 3,405,773
Patented Oct. 15, 1968

3,405,773
SLEEVE VALVE AND OIL WELL TOOL EMBODYING THE SAME
Wayne N. Sutliff and Jim L. Downen, both of 2931 Pierce Road, Bakersfield, Calif. 93308
Filed Aug. 5, 1966, Ser. No. 570,564
9 Claims. (Cl. 175—297)

ABSTRACT OF THE DISCLOSURE

Telescopically related inner and outer tubular mandrels between which axially spaced O-rings confine a body of light oil retardant, an annular sealing shoulder and an annular stop shoulder being provided on said inner mandrel between which shoulders a valve sleeve has free end-play, said valve sleeve having spring legs frictionally engaging said outer mandrel causing said valve sleeve to be positively opened (separated from said sealing shoulder) when telescopic contraction of said mandrels starts and positively closed (shifted against said sealing shoulder) when telescopic extension of said mandrels starts.

BACKGROUND OF THE INVENTION

Field of the invention

The development of telescopic tools used in oil well drilling, coring, and production operations and particularly in fishing operations and in the testing of wells. Specifically the invention relates to sleeve valves operating under exceedingly high pressures and particularly to oil well tools having inner and outer mandrels, the relative telescopic travel of which in a given direction is hydraulically retarded by a sleeve valve, while allowing comparatively free telescopic travel between said mandrels in the opposite direction. It represents an improvement on the sleeve valves and oil well tools shown in our prior U.S. Patents Nos. 2,645,459, 2,922,626 and 3,088,533.

DESCRIPTION OF THE PRIOR ART

In the hydraulic jar disclosed in the first of said patents, a spring is provided to assure closing of the sleeve valve upon a reversal in the direction of the telescopic relative movement between the inner and outer mandrels of the tool which had caused the valve to open. In the jars disclosed in the latter two of said patents, no such spring is provided, simply because it was not found necessary. This was attributed to the fact that the friction between the valve sleeve and the bore within the outer mandrel, into which said sleeve slidingly fits, retarded longitudinal movement of said sleeve in said bore excepting when said sleeve was positively engaged by the inner mandrel. The closing of the sleeve valve at the beginning of each jarring stroke was produced by the sleeve valve being lifted with the outer mandrel (which in the latter two jars is attached to the drill string) to close the short gap between the ground end of the sleeve and the ground seat on the inner mandrel thus closing the valve and imposing hydraulic restraint upon further lifting of the drill string. This permitted the latter to be tensioned in preparation for the delivery of a jarring blow at the conclusion of said stroke.

In practical use of the latter two types of patented hydraulic jars in the oil fields, and particularly the jar disclosed in Patent No. 3,088,533, exceptional instances have occurred in which the friction between the valve sleeve and the outer mandrel has not sufficed to close the valve at the beginning of each jarring stroke as promptly and dependably as is desirable.

SUMMARY OF THE INVENTION

It is an object of the present invention to provide an improved sleeve valve and an oil tool embodying the same requiring hydraulic retardation of telescopic movement in one direction between the outer and inner mandrels of said tool and relatively free telescopic movement between said mandrels in the opposite direction, which sleeve valve will be dependable in promptly closing at the beginning of each retardation stroke between said mandrels.

Another object is to provide such an improved sleeve valve, the dependable performance of which is effected by a novel means for producing friction between said sleeve valve and the outer mandrel of said tool, which means does not interefere with the use of the space between the outer surface of said valve and said bore as a restricted escape passage for liquid trapped by said sleeve valve in said retardation stroke.

A further object is to provide such an improved sleeve valve in which said friction-producing means is at the opposite end of said sleeve valve from the sealing end face thereof, and is of a resilient character so as to compensate for wear and remain operative through the long working life of the tool.

Considerable difficulty has been experienced in the manufacture of tools embodying a sleeve valve, of the general type to which this invention relates, in producing such a perfect matching relation between the annular ground face on the end of the valve with the ground seat provided on the inner mandrel to be engaged by said face for closing the valve, so as to prevent entrance of the liquid confined by the valve under tremendously high pressure, between said face and said seat so that the liquid so admitted forced open the valve during a period in which it is desired that the valve remain closed.

It is still another object of the present invention to provide an improved sleeve valve which is so designed as to simplify and solve the problem of preventing liquid confined under high pressure from passing between said valve and said seat when said valve is closed.

BRIEF DESCRIPTION OF THE DRAWINGS

FIG. 1 is a diagrammatic perspective view of a preferred embodiment of the valve sleeve of the invention with the same elevated slightly above the point of view of the observer and drawn approximately to true scale, the castellated conformation of the lower end of said sleeve being clearly shown in this view.

FIG. 2 is a diagramtic elevational view of a preferred embodiment of the oil tool of the invention with the left half of this being shown in section and with said tool, which is a hydraulic jar, shown at the point in its operation where the upward movement of the outer mandrel has just started and proceeded far enough to shift the valve sleeve of the invention upwardly into closed relation with the annular seal ring immeditaely thereabove thereby closing said valve.

FIG. 3 is a view similar to FIG. 2 showing the parts of said jar as related at the conclusion of said jarring operation.

FIG. 4 is an enlarged fragmentary sectional view of the invention which is drawn to full scale of a commercial embodiment of the invention and illustrates the parts thereof positioned as at the start of a jarring stroke.

FIG. 5 is a fragmentary horizontal sectional view taken on the line 5—5 of FIG. 4, with the valve sleeve of the invention removed from the outer tubular mandrel thereof. This view thus illustrates how the outside diameter of said sleeve at the lower end thereof exceeds the inside diameter of the outer mandrel of the tool into which said sleeve must fit, by approximately two-thousandths of an inch.

FIG. 6 is an enlarged fragmentary vertical sectional view taken in a radial plane containing the axis of the tool and illustrating the relationship between the annular ground face provided on the sleeve valve of the invention and the annular ground seat provided on the inner mandrel of said tool when the valve is closed.

DESCRIPTION OF THE PREFERRED EMBODIMENT

Referring specifically to the drawings, the invention is there illustrated as embodied in a hydraulic jar 10 which includes an outer mandrel 11 and an inner mandrel 12 which are telescopically related.

The outer mandrel 11 is in the general form of a tubular cylinder having a bore 13, the upper end of which has a counterbore 14 for receiving a seal ring 15, and the upper portion of this counterbore is internally threaded to connect with a sub 16 which has internal threads at its upper end for screwing onto a pin 17 provided on the lower end of a drill string 18.

The bore 13 also has a lower counterbore 19 which terminates at its lower end with an internal shoulder 20 having a bore 25 and being externally threaded to screw into an outer spline sub 26. The bore 25 is provided with suitable annular grooves for receiving O-rings 27, the purpose of which will be made clear hereinafter.

The outer spline sub 26 has a series of splines 28 formed vertically about the inner surface thereof, these splines being separated by grooves 29.

The seal ring 15 has an internal bore 30 which has the same diameter as bore 25 and is internally and externally grooved to receive O-rings 31 and 32, the purpose of which will be made clear hereinafter. The top sub 16 has a bore 33 which is of the same or slightly larger diameter than the bores 25 and 30.

Inner mandrel 12 has a cylindrical axial passage 34 which extends throughout its length and this mandrel includes three integral sections, to wit: upper section 40, middle section 41 and lower section 42. Sections 40 and 42 are of the same outside diameter and are slidably received respectively by bores 30 and 25. The lower end of section 42 is externally threaded and screws into suitable threads provided in the upper end of a bottom spline sub 43. This sub has an internal passage 44 of equal or greater diameter to that of passage 34 in the inner mandrel 12 and has a threaded pin 45 which screws into the upper box end of a sub 46 on which a fishing tool or any other oil well tool may be suspended. The bottom spline sub 43 has external male splines 47 and spline grooves 48 which mesh with the internal splines 28 and grooves 29 of the outer spline sub 26.

The middle section 41 of inner mandrel 12 is shaped to provide its lower end an annular radially extending stop 55, which also acts as an anvil in the operation of the jar 10.

An upper portion of the middle section 41 has external threads 56 and the central portion 57 between the threads 56 and the stop 55 has four flat faces 58 and four segmental cylindrical faces 59 and four segmental cylindrical grooves 60 at the lower ends of faces 59 which are formed contiguous with the upper face 61 of stop 55. The upper ends of flat faces 58 terminate in the same horizontal plane with the upper ends of faces 59 and the latter have a common radius which causes these to produce shoulders which extend out beyond the base of the threads 56 and thus form stops 59a for a ring 62 which is screwed onto the threads 56 to make a tight engagement with the upper end of the central portion 57 of the middle section 41 of the inner mandrel 12.

Before the ring 62 is thus screwed on the threads 56, a sleeve valve 63 is slipped over the upper section 40 of the inner mandrel 12 and over the threads 56 and onto the central portions 57 of the middle section of the inner mandrel. The valve 63 is in the form of a cylindrical tubular sleeve having an inner bore 64 which is only slightly larger than the outside diameter of the segmental cylindrical faces 59 so that the valve 63 is rotatable and vertically slidable on the faces 59 within the vertical limits offered by the stop 55 and ring 62. The ring 62 forms an annular radial shoulder and has an annular seat 65 ground on its lower end which seat lies in a true radial plane when the ring 62 is installed, as above noted.

The upper end of valve sleeve 63 is provided with an annular ground face 70 which matches annular seat 65 on the ring 62 to form a tight annular seal cutting off any passage of liquid between said sleeve and said ring when these two elements are brought into contact by operation of the jar 10.

Referring now to FIGS. 4 and 5, it is to be noted that the bore 13 of the outer mandrel 11 is there shown as being 2.875 inches. It is also to be noted, as shown in FIG. 5, that the lower end portion of the sleeve 63 has an outside diameter of 2.877 inches, which is two-thousandths of an inch in excess of the diameter of the bore in which this sleeve must slidably operate. This apparent conflict has the following explanation. In the manufacture of the sleeve 63, it is formed from a tubular piece of lathe stock having an outside diameter in excess of 2.9 inches, which is then turned down throughout its length to an outside diameter of 2.877 inches, after which an annular channel 71 is turned in the periphery of the sleeve which is located a short distance upwardly from the lower end of the latter and then four wide and deep axial notches 72 are milled in the lower end edge of the sleeve 63, the upper ends of which notches terminate at the upper edge of the channel 71, said notches dividing the lower end portion of the sleeve into four resilient pressure legs 73. Being four in number, these legs comprise two pairs of opposed legs, each pair having arcuate pressure faces 74 at their lower ends, which faces of each such pair of legs present an outside diameter (that is: measured together) of 2.877 inches. The remaining machining steps in the manufacture of the sleeve 63 include reducing the outside diameter of the portion of the sleeve 63 between the annular channel 71 and the ground face 70 to produce a peripheral surface 75 with an outside diameter of 2.873 inches; then turning an annular channel 76 in surface 75 spaced from ground face 70 as shown in the scale drawing of FIG. 4 and, finally, forming a series of axial channels 77 which connect channel 76 with the ground end of the sleeve 63.

When assembling the hydraulic jar 10, a cushion 80 comprising a ring of rubber or like material which is impregnated with air bubbles is inserted in the bore 13 just beneath the seal ring 15 and is of the proper size to just fit the bore on the outer surface of the inner mandrel 12. The purpose of this ring will be made clear hereinafter.

Just below the lower end of the cushion 80, the wall of the outer mandrel 11 is provided with a threaded hole for receiving an air vent plug 85 and a similar hole is provided for a filling plug 86 in the shoulder 20, which plugs are provided for the purpose of filling the annular chamber 87 formed within the bore 13 and counterbore 19 between the seals 15 and 27, with an operating liquid which is preferably a light lubricating oil. This operating liquid is retained in chamber 87 by the seal formed by O-rings 27 at the lower end of the chamber and by the seals formed by O-rings 31 and at 32 at the upper end of said chamber.

The outer spline sub 26 is provided with liquid circulating holes 79 and 79a to allow external well liquid to circulate between the outer spline sub 26 and the inner spline sub 43 to lubricate the same.

OPERATION

In preparing the hydraulic jar 10 of the invention for use, the plugs 85 and 86 are removed, the chamber 87 filled with a light lubricating oil and the plugs 85 and 86 are then replaced. The jar 10 is then screwed onto the lower end of a section of drill string 18 and a sub 46 screwed onto the lower end of the jar, this sub being connected with a fishing tool or any other tool which it is desired to extend into the well and which may require a jarring operation incidental to its operation in the well.

The chamber 87 is usually filled with oil while the outer and inner mandrels 11 and 12 are telescopically related as shown in FIG. 3. In this relative position of the mandrels, the middle section 41 of the inner mandrel is disposed in the lower portion of liquid chamber 87 within the confines of the counterbore 19. This counterbore having a substantially larger inner diameter than the peripheral surface 75 and the pairs of pressure faces 74 on the sleeve 73, there is very slight resistance to axial movement of the inner mandrel 12 within the outer mandrel 11 while the middle section 41 of the inner mandrel is located within counterbore 19.

The outer and inner spline subs 26 and 43 are in relatively extended relation, with the inner and outer mandrels telescopically related as shown in FIG. 3, but the splines thereof are still enmeshed so that rotary motion may always be transferred from the drill string 18 through the outer mandrel 11 to inner spline sub 43 and through the latter to the sub 46 suspended on the lower end of said inner spline sub.

When the inner mandrel 12 becomes supported from below as by the sub 46 and the elements suspended therefrom coming to rest on the bottom of the well, a continued downward movement of the drill string 18 produces a telescopic motion between the outer and inner mandrels terminating wtih the outer and inner spline subs 26 and 43 being completely telescoped, and in the middle section 41 of the inner mandrel 12 being elevated relatively in the liquid chamber 87 until the sleeve valve 63 is entirely confined within the bore 13 with the sleeve 63 resting with its lower end face 91 on the face 61 of the anvil stop ring 55.

While this relative movement is taking place, a free passage is provided for liquid to flow inwardly between the upper end of sleeve 63 and the lower end of ring 62, and then downwardly through the free spaces formed by the flat faces 58 of the central portion 57 of the inner mandrel 12 and then outwardly through the notches 72 into the portion of chamber 87 disposed therebelow. This free passage of fluid around the valve sleeve 63 takes place throughout any relative movement between the outer mandrel 11 and the inner mandrel 12 when the direction of relative movement of the outer mandrel is downwards. This takes place, of course, when the outer mandrel shifts from the extended position in which it is shown in FIG. 3 to the fully retracted position just below that in which it is shown in FIG. 2 to reset the tool 10 for a jarring stroke.

If is now desired to point out the significance of the arcuate pressure faces 74 provided on the resilient pressure legs 73 formed on the lower end of the valve sleeve 63. These pressure faces are provided in pairs, each of which has a gross outside diameter in excess of the inside diameter of the outer mandrel bore 13 in which said valve sleeve must slidably operate. Obviously it is the resilient character of the legs 73 which makes this possible. When, during the lowering of the outer mandrel 11, the lower end of the bore 13 slides over the peripheral surface 75 of sleeve 63, this portion of the sleeve is freely received in said bore, having an outside diameter which is two-thousandths of an inch less than the inside diameter of said bore. As the downward movement of the outer mandrel 11 continues, the lower edge of the bore 13 rides over the arcuate pressure faces 74 formed on the legs 73 and constricts these pairs of legs inwardly toward each other so as to cause these legs to tightly fit within the bore 13. This produces a very substantial frictional pressure of the outer mandrel against the sleeve 63 forcing this downwardly, although said sleeve already has been and is resting on the annular stop 55 which forms the anvil of the tool 10.

As soon as the downward movement of the outer mandrel 11 halts anytime after the sleeve legs 73 frictionally engage bore 13 of the outer mandrel, and the rig operator starts to raise the drill string on which this mandrel is suspended in the performance of a jarring stroke, the friction between the pressure faces 74 of the sleeve legs 73 and the bore 13 of the outer mandrel 11, lifts the valve sleeve 63 and presses the annular ground face 70 on the upper end thereof against the annular seat 65 formed on the inner mandrel ring 62. This is the position of the valve sleeve 63 (and the above described point in the operation of the jar 10) which is illustrated in FIGS. 2 and 6. It is thus seen that the pressure of these pressure faces against the outer mandrel serve to positively lift the valve sleeve 63 into closing relation with the ring 62 immediately upon the starting of the jarring stroke of the tool 10. This positive actuation of the valve sleeve 63 assures the proper closing of this valve at the beginning of each operative stroke of the tool 10 and precludes the failure of this valve to close. The need for a spring to constantly bias the valve sleeve 63 towards the inner mandrel ring 62 is thus completely eliminated.

As pointed out in our U.S. Patents Nos. 2,922,626 and 3,088,533, the extremely high liquid pressure developed in the liquid chamber 87 beneath the sleeve valve 63 during a jarring stroke of the tool 10, results in the extreme upper end portion of the valve sleeve 63 becoming expanded with each jarring stroke and ultimately taking a set which increases the outside diameter of that portion of the sleeve to approximately the inside diameter of the bore 13. The provision of the annular channel 76 and axial channels 77 are provided to permit the continued flow past the sleeve valve 63 of liquid escaping upwardly between the bore 13 and the peripheral surface 75 of said sleeve, and access to the lower end of this annular escape passageway between the sleeve 63 and the bore 13 is kept open by the provision of annular channel 71 and the four notches 72 in the lower end portion of said sleeve.

The cushion 80 is provided for cushioning the shock produced by spudding of the tool 10 and thus preventing damage being done to the tool.

Referring now to FIG. 6, a modified form of the sleeve valve 63 is shown therein in which the upper end of the valve is provided with a ground face 70' which is slightly conoidal in character so that said face only engages the ground annular seat 65 on the ring 62 in the area immediately adjacent the bore of the sleeve valve 63. The result of this is that a tight seal between the face 70' and the seat 65 adjacent the bore of the valve 63 is assured and a tight seal at this location completely prevents the liquid confined under high pressure by said valve penetrating between said valve face and said seat.

The exclusion of this liquid from between the valve and the valve seat eliminates any opportunity for this liquid to bear against the ground face of the valve and thus force the valve open when it is desired that this remain closed.

The claims are:

1. In a sleeve valve provided for use in an oil well tool, the latter embracing outer and inner tubular mandrels assembled for telescopic relative movement, said mandrels confining a chamber containing a body of retarding liquid between spaced annular seals, said inner mandrel having an annular valve seat and a stop spaced axially therefrom, the combination of: a sleeve disposed, when in use, within said chamber with freedom for endwise movement between said annular seat and said stop, said sleeve having a ground annular face at one end for valve closing engagement with said seat, a major portion of the outer surface of said sleeve slidably fitting within said outer mandrel to allow a restricted flow of liquid axially therebetween when said valve is closed, said sleeve loosely fitting said inner mandrel to allow a free flow of liquid axially therebetween when said valve is opened by relative telescopic movement between said mandrels in the opposite direction; and friction means provided on said sleeve in a limited area of the outer surface thereof, said means having a substantially tighter fit within the bore of said outer mandrel than the balance of said outer surface and thereby positively retarding endwise movement of said sleeve relative to said outer mandrel and causing said sleeve to be positively shifted endwise into closed relation with said annular seat by telescopic relative movement between said mandrels at the start of a retardation stroke of said tool.

2. A sleeve valve as recited in claim 1 wherein said limited areas occupied by said friction means are located adjacent the opposite end of said sleeve from the ground annular end face thereof, there being openings in said sleeve permitting said operating liquid to bypass said friction means and thus have access to the restricted flow space between said sleeve and said outer mandrel.

3. A sleeve valve as recited in claim 2 wherein said openings in said sleeve comprise a series of deep notches formed axially in the wall of said sleeve from the end thereof adjacent said friction areas, said notches extending axially past said areas into communication with said restricted flow space and producing a castellated division of the aforesaid friction areas on said sleeve rendering the same resiliently responsive to pressure applied thereto by the bore of said outer mandrel.

4. A sleeve valve as recited in claim 3, wherein the outer surface of said sleeve is provided with channels located inwardly from said friction areas and communicating with inner ends of said notches, whereby full and free access is had by said operating liquid to said restricted annular flow space between said sleeve and said outer mandrel, and the radial resiliency of the sleeve portions located between said notches and which carry said friction means is enhanced.

5. In a telescopic oil well tool, the functioning of which depends upon hydraulic damping of relative axial movement between the telescopic parts thereof in a given direction, the combination of: inner and outer mandrels telescopically arranged for longitudinal movement relative to one another, said outer mandrel having a bore which provides a hydraulic chamber; a valve sleeve slidably mounted on said inner mandrel and making a sliding fit with said bore; an annular shoulder on said inner mandrel at one end of said sleeve, there being matching annular ground faces provided on said shoulder and on the adjacent end of said sleeve; friction means provided on relatively limited circumferentially disposed areas of said sleeve having a substantially tighter fit within said bore than the balance of said sleeve; and a stop on said inner mandrel spaced from the opposite end of said sleeve to permit a limited degree of relative axial movement between said sleeve and said inner mandrel, relatively large axial passage means being provided between said sleeve and said inner mandrel and extending between said shoulder and said stop, said passage means providing relatively free hydraulic communication between the portions of said chamber at opposite ends of said sleeve when said sleeve is out of contact with said annular shoulder, said sleeve and said shoulder forming a valve which is closed by engagement of said ground faces, said closing being assured by the frictional engagement of said friction means with said outer mandrel upon the initiation of said relative axial movement in said given direction between said mandrels, bleeder escape passage means being provided which permits a relatively small flow of liquid to bypass said sleeve while said valve is closed, thus damping said relative axial movement in said given direction between said mandrels.

6. A telescopic oil well tool as recited in claim 5, wherein said bleeder escape passage means comprises the space confined between said bore and a major portion of the outer peripheral surface of said sleeve, and wherein said areas occupied by said friction means are spaced circumferentially by axial openings formed in said sleeve which bypass said areas and communicate with said bleeder escape passage means.

7. A telescopic oil well tool as recited in claim 6, wherein said areas occupied by said friction means are located at the opposite end of said sleeve from the end having said annular ground face, and wherein circumferentially disposed channels are formed in said sleeve separating said friction areas from the peripheral surface of said sleeve forming said bleeder escape passage means, and wherein axial passages are provided in the end portion of said sleeve having said friction means which bypass the latter and give access to said circumferential channels and through said channels to said bleeder escape passage means.

8. A telescopic oil well tool as recited in claim 5 wherein the circumferentially disposed areas occupied by said friction means are located at the opposite end of the sleeve from said annular ground face and are separated by a series of deep notches formed axially in that end of said sleeve, which notches extend inwardly beyond said areas to divide said end portion of said sleeve into a circumferential series of resilient legs and give liquid access from that end of said sleeve to said bleeder escape passage means.

9. An oil well tool embracing outer and inner tubular mandrels assembled for telescopic relative movement; a pair of spaced annular seals, said mandrels and spaced annular seals confining a chamber for containing a body of retarding liquid, said inner mandrel having an annular valve seat with a ground annular face and a stop spaced axially therefrom; and a sleeve valve comprising a sleeve slidably disposed within said chamber with freedom for endwise movement between said annular seat and said stop, said sleeve having a ground annular face at one end for valve-closing engagement with the aforesaid face of said seat, said faces being respectively shaped to meet to form a sealing engagement therebetween only in a relatively narrow annular area directly adjacent the inner edge of the annular face on said sleeve, room being provided between said sleeve and said outer mandrel to allow only a restricted flow of liquid axially in a given direction past said valve when the latter is closed, ample room being provided between said sleeve and said inner mandrel to permit a relatively free flow of liquid axially between said valve and said inner mandrel in the opposite direction upon the opening of said valve.

References Cited

UNITED STATES PATENTS

| | | | |
|---|---|---|---|
| 2,922,626 | 1/1960 | Sutliff | 175—297 |
| 2,987,129 | 6/1961 | Webb | 175—297 |
| 3,004,616 | 10/1961 | Nutter et al. | 175—297 |
| 3,088,533 | 5/1963 | Sutliff | 175—297 |

DAVID H. BROWN, *Primary Examiner.*